US007340378B1

(12) United States Patent
Floyd et al.

(10) Patent No.: US 7,340,378 B1
(45) Date of Patent: Mar. 4, 2008

(54) WEIGHTED EVENT COUNTING SYSTEM AND METHOD FOR PROCESSOR PERFORMANCE MEASUREMENTS

(75) Inventors: Michael S. Floyd, Austin, TX (US); Soraya Ghiasi, Austin, TX (US); Thomas W. Keller, Jr., Austin, TX (US); Karthick Rajamani, Austin, TX (US); Freeman Leigh Rawson, III, Austin, TX (US); Juan C. Rubio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/565,106

(22) Filed: Nov. 30, 2006

(51) Int. Cl.
*G06F 19/00* (2006.01)
(52) U.S. Cl. ......................... 702/186; 714/25
(58) Field of Classification Search ................ 702/186, 702/182–185, 188; 709/238, 242, 201; 714/25, 48
See application file for complete search history.

(56) References Cited

U.S. PATENT DOCUMENTS

| | | | |
|---|---|---|---|
| 5,557,548 A | 9/1996 | Gover et al. |
| 5,657,253 A | 8/1997 | Dreyer et al. |
| 5,796,637 A | 8/1998 | Glew et al. |
| 6,112,318 A | 8/2000 | Jouppi et al. |
| 6,233,531 B1 | 5/2001 | Klassen et al. |
| 6,275,782 B1 | 8/2001 | Mann |
| 6,351,724 B1 | 2/2002 | Klassen et al. |
| 6,546,359 B1 | 4/2003 | Week |
| 6,676,777 B2 | 1/2004 | Rao et al. |
| 6,792,392 B1 | 9/2004 | Knight |
| 2002/0073255 A1 | 6/2002 | Davidson et al. |
| 2004/0216113 A1 | 10/2004 | Armstrong et al. |
| 2004/0236993 A1 | 11/2004 | Adkisson et al. |
| 2004/0237003 A1 | 11/2004 | Adkisson et al. |
| 2005/0021292 A1* | 1/2005 | Vock et al. ................ 702/182 |
| 2005/0081101 A1 | 4/2005 | Love et al. |
| 2005/0155021 A1 | 7/2005 | DeWitt et al. |

(Continued)

OTHER PUBLICATIONS

U.S. Appl. No. 11/538,131, filed Oct. 3, 2006, Ghiasi et al.

(Continued)

*Primary Examiner*—Edward Raymond
(74) *Attorney, Agent, or Firm*—Mitch Harris, Atty at Law, LLC; Andrew M. Harris; Casimer K. Salys

(57) ABSTRACT

A weighted event counting system and method for processor performance measurements provides low latency and low error performance measurement capability. A weighted performance counter accumulates a performance count according to a plurality of event signals provided from functional units in the processor. Differing weights are applied to the event signals in according to the correlation between each event with processor performance. The weights may be provided from programmable registers, so that the weights can be adjusted under program control. The event signals may be combined to reduce the bit-width of the set of event signal, with mutually-exclusive events merged in single fields of the combinatorial result and events having the same weights merged according to a sub-total. The weights are applied to the combinatorial result and used to update a performance count. The performance count can then be used by power management software or hardware to make adjustments in operating parameters of the processor.

7 Claims, 3 Drawing Sheets

U.S. PATENT DOCUMENTS

2005/0177344 A1    8/2005    Khaleel
2005/0183065 A1    8/2005    Wolczko et al.
2005/0283677 A1    12/2005    Adkisson et al.

OTHER PUBLICATIONS

May, John M., "MPX: Software for Multiplexing Hardware Performance Counters", IPDPS Proceedings 2001.

Ghiasi, et al., "Scheduling for Heterogeneous Processors in Server Systems", Conf. on Computing Frontiers, pp. 199-210, May 2005.

Kotla, et al., "Scheduling Processor Voltage and Frequency in Server and Cluster Systems", IPDPS 19$^{th}$ Symposium, Apr. 2005.

Kotla, et al., "Characterizing the Impact of Different Memory Intensity Levels", 7$^{th}$ Annual Workshop on Workload Characterization, Oct. 25, 2004.

\* cited by examiner

WEIGHTED EVENT COUNTING SYSTEM AND METHOD FOR PROCESSOR PERFORMANCE MEASUREMENTS

BACKGROUND OF THE INVENTION

1. Technical Field

The present invention relates generally to processor performance measurement systems, and more particularly, to a performance counting system with low latency and error.

2. Description of the Related Art

Performance measurement in processing units is typically performed by a set of counters that accumulate information about the usage of units within the processor. By obtaining such usage information, sophisticated power management algorithms can adjust operating conditions such as processor frequency and voltage, idle time or other energy usage control mechanism to reduce power consumption or dissipation, while ideally providing a minimal impact on processing performance.

Accurate performance evaluating systems have been proposed based on a complex polynomial metric, but require measurement of a large number concurrent events. If the events contributing to the performance measurement are the individual usage of a set of processing units as mentioned above, then a counter is provided for each unit for which usage is being measured. In such implementations, a large number of counters is required to measure performance in present-day processors, which may have multiple pipelines having dozens of processing units, cache units, and other units that contribute to overall processor performance. However, existing performance counting implementations typically require a separate counter for each metric being measured and typically do not process a large number of events concurrently. Therefore, such performance counting implementations cannot provide an accurate estimate of performance change when power management control changes operating parameters of a processor.

One alternative to the above-described scheme of providing a usage counter for each metric, is to time-multiplex a smaller set of counters (or a single counter) to perform the individual measurements. However, the overall latency of such a scheme is too high for energy management systems requiring a fine granularity of control. Further, the inter-metric measurement delays introduce error into the measurements. Even when individual counters are employed, they are not typically accessed simultaneously, which also introduces both inter-metric delay error and latency.

It is therefore desirable to provide a performance counting method and system that provides usage information having low error and latency. It would be further desirable to provide such a system and method that does not require a counter for each metric contributing to the overall performance measurement.

SUMMARY OF THE INVENTION

The objective of providing low latency, low error performance measurement without requiring a counter for each metric is achieved in a weighted performance counter circuit and method, which may be incorporated in a processor.

The weighted performance counter receives a plurality of event signals indicating events occurring at a plurality of functional units within the processor. The signals are weighted according to the correlation of the events with processor performance, and the resulting weighted event value accumulated by a performance counter. The count may be accumulated at each processor clock cycle. The weights may be provided from programmable registers so that the weights can be adjusted under program control, or the weights may be fixed values provided within the circuit.

A combinatorial logic may combine the plurality of event signals, with events having the same weight accumulated in sub-total fields. Mutually-exclusive events may be merged in a single field within the combinatorial result.

The resulting weighted performance count may be used by system management software and/or hardware to adjust operating parameters of the processor to maximize performance, estimate power consumption or predict power consumption changes.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention concerns a circuit and method for performance counting that provide reduced performance measurement error and latency by simultaneously counting events of multiple event types using a single performance counter. In order to accurately reflect the correlation of each event type to system or processor performance, the events are weighted prior to being counted, i.e., depending on which event(s) are counted in a single processor cycle or other interval on which each event is counted, the value by which the counter is incremented differs by both the number of each event type and the event types themselves. For example, an L1 cache miss indicates a different performance penalty than an L2 cache miss and therefore would be weighted differently to produce a different change in the performance count. The overall rate of events is generally monotonic with performance. However, an increase of certain events, such as cache misses in proportion to other events, such as instructions completed, indicates a reduction in performance.

Performance of a processor or other device/system can be determined from a complex polynomial metric that uses separate coefficients to combine counts of each significant performance-dependent event in the processor by scaling events according to their correlation with performance. However, as mentioned above, such event counting requires a large number of counters, or a multiplexing scheme that introduces overall measurement latency and inter-event count latency error. Therefore, the complex polynomial metric when supported by the weighted performance counter of the present invention provides an improved model of performance by providing differing impact on the performance count for different events with a reduction in circuit area and power required for monitoring or a reduction in measurement latency and error over multiplexed schemes. The resulting performance information can then be applied as input to power management control systems such as those described in U.S. patent application Ser. No. 11/538,131 entitled "METHOD AND SYSTEM FOR IMPROVING PROCESSING PERFORMANCE BY USING ACTIVITY FACTOR HEADROOM", which is incorporated herein by reference.

Figure 1:
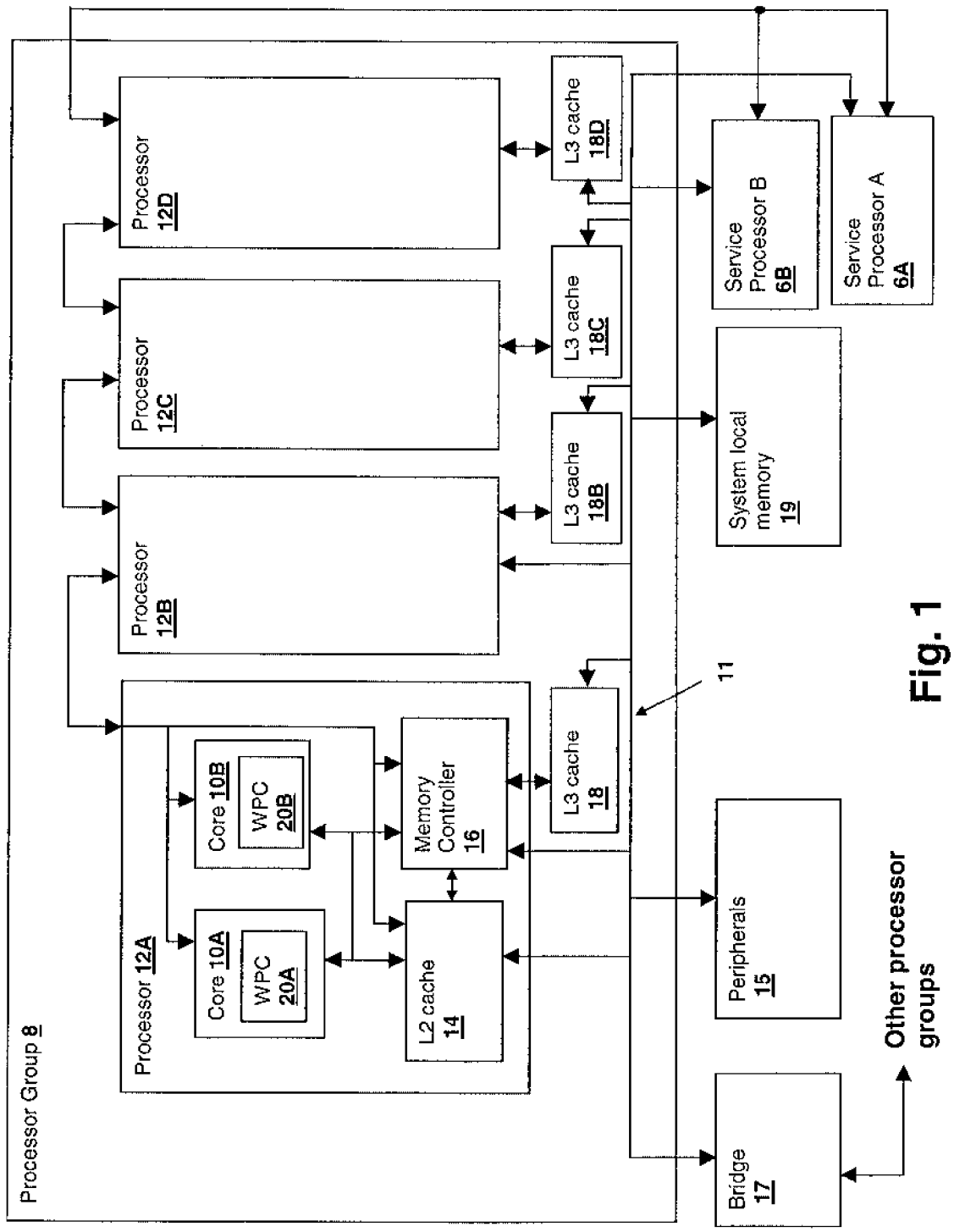
FIG. 1 is a block diagram of a processing system incorporating processors in accordance with an embodiment of the invention.

With reference now to the figures, and in particular with reference to FIG. 1, there is depicted a block diagram of a system incorporating processors in accordance with an embodiment of the present invention. The system includes a processor group 8 that may be connected to other processor groups via a bridge 17 forming a super-scalar processor. Processor group 8 is connected to system local memory 19 and various peripherals 15, as well as to two service processors 6A and 6B. Service processors 6A and 6B provide fault supervision, startup assistance and test capability to processor group 8 and may have their own interconnect paths to other processor groups as well as connecting all of processors 12A-D. Further one or both of service processors 6A and 6B may perform performance and power measurement/management and may perform such control in conformity with performance counts read from one or more weighted performance counters in accordance with an embodiment of the invention.

Within processor group 8, are a plurality of processors 12A-D, each generally fabricated in a single unit and including a plurality of processor cores 10A and 10B coupled to an L2 cache 14 and a memory controller 16. Cores 10A and 10B provide instruction execution and operation on data values for general-purpose processing functions. A separate L3 cache 18A-D is provided for each of processors 12A-D. Bridge 17, as well as other bridges within the system provide communication over wide buses with other processor groups and bus 11 provides connection of processors 12A-D, bridge 17, peripherals 15, L3 caches 18A-D and system local memory 19. Other global system memory may be coupled external to bridge 17 for symmetrical access by all processor groups.

Figure 2:
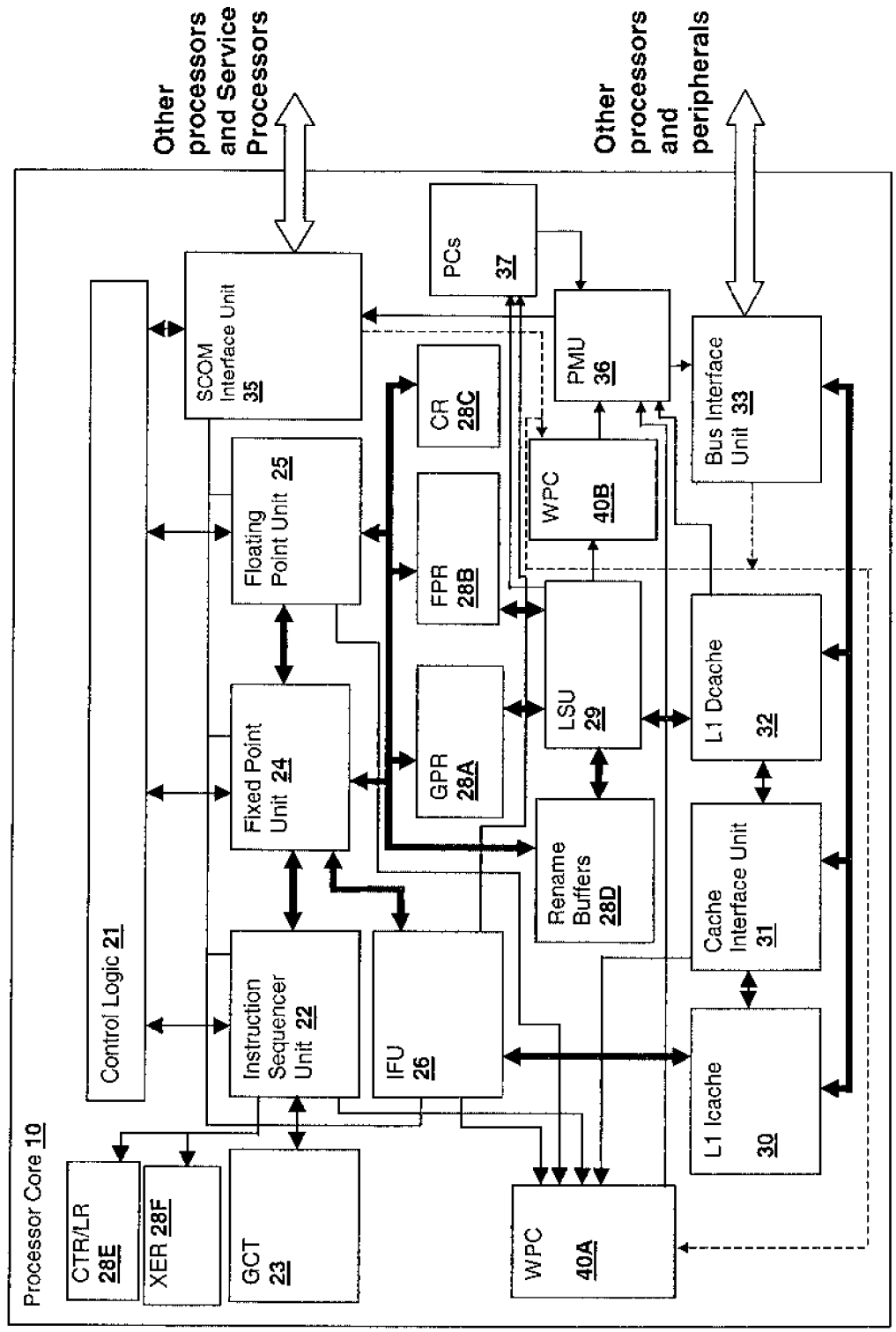
FIG. 2 is a block diagram of a processor core in accordance with an embodiment of the invention.

Referring now to FIG. 2, details of a processor core 10 having features identical to processor cores 10A and 10B is depicted. A bus interface unit 33 connects processor core 10 to other processors and peripherals and connects L1 Dcache 32 for storing data values, L1 Icache 30 for storing program instructions and cache interface unit 31 to external memory, processor and other devices. L1 Icache 30 provides loading of instruction streams in conjunction with instruction fetch unit IFU 26, which prefetches instructions and may include speculative loading and branch prediction capabilities. An instruction sequencer unit (ISU) 22 controls sequencing of instructions issued to various internal units such as a fixed point unit (FXU) 24 for executing general operations and a floating point unit (FPU) 25 for executing floating point operations. Global completion tables (GCT) 23 track the instructions issued by ISU 22 via tags until the particular execution unit targeted by the instruction indicates the instructions have completed execution.

Fixed point unit 24 and floating point unit 25 are coupled to various resources such as general-purpose registers (GPR) 28A, floating point registers (FPR) 28B, condition registers (CR) 28C, rename buffers 28D, count registers/link registers (CTR/LR) 28E and exception registers (XER) 28F. GPR 28A and FPR 28B provide data value storage for data values loaded and stored from L1 Dcache 22 by load store unit (LSU) 29. CR 28C stores conditional branching information and rename buffers 28D (which may comprise several rename units associated with the various internal execution units) provides operand and result storage for the execution units. XER 28F stores branch and fixed point exception information and CTR/LR 28E stores branch link information and count information for program branch execution. Control logic 21 is coupled to various execution units and resources within processor core 10, and is used to provide pervasive control of execution units and resources. An SCOM/XSCOM interface unit 35 provides a connection to external service processors 34A-B.

Processor core 10 also includes a performance monitoring unit 36 that gathers performance count values provided by a set of ordinary performance counters 37 and weighted performance counters 40A and 40B in accordance with an embodiment of the present invention. Performance counters 37 are used to count additional events that are not counted by weighted performance counters 40A and 40B. A polynomial performance metric can be computed by performance monitoring unit 36, or performance monitoring unit 36 can provide indications of the count values from performance counters 37 and weighted performance counters 40A and 40B to external software such as a hypervisor executing within one or more of processors 12A-12D in the processing system of FIG. 1, or a service processor program executed by one of service processors 6A or 6B. Performance measurement unit 36 and performance counters 37 and weighted performance counters 40A,40B may also be located external to processor core 10. For example, processors 12A-12D of FIG. 1 may each include a performance measurement unit, with event signals provided from each of cores 10A and 10B, memory controller 16 and L2 cache 14.

Performance counters 37 and weighted performance counters 40A,40B receive inputs that signal the occurrence of various events within processor core 10. In the exemplary embodiment, weighted performance counter 40A is shown as receiving events from various functional processing blocks such as ISU 22, IFU 26, FPU 25 and cache interface unit 31. Weighted performance counter 40B receives an event bus input from LSU 29. Performance counters 37 will generally include a counter that counts processor cycles, so that evaluation of all of the event counts relative to the number of processor cycles can be made. The exemplary event monitoring scheme is illustrative of a dual counter weighted event counting scheme, where events that are memory latency dependent are counted by weighted performance counter 40B, while weighted performance counter 40A counts events that are processor clock frequency dependent. Since most power management schemes adjust processor clock frequency and voltage, while the memory latency remains unchanged, the memory latency in processor clock cycles changes as the processor clock frequency is changed. Using separate weighted performance counters 40A and 40B for the memory latency dependent events and processor clock frequency dependent events provides a mechanism for independently evaluating the impact of processor frequency changes on the two differing types of events. The exemplary embodiment tracks the number of processor cycles, the number of instructions completed and the miss rate for each level in the memory hierarchy. From the resulting counts, the memory latencies that depend on the frequency of the processor can be identified and an estimate of performance versus processor frequency determined as instructions per second or other performance figure of merit. Power management algorithms can then use the estimated performance versus frequency result to make power management decisions on-the-fly.

In the depicted embodiment, performance monitoring unit 36 has outputs coupled to bus interface unit 33 and SCOM interface 35, so that the resulting performance measurement from weighted performance counters 40A-40B and performance counters 37 can be read by one of service processors 6A,6B or another processor coupled to bus 11. Alternatively, program readable registers may be provided from performance monitoring unit 36. Weighted performance counters 40A-40B have inputs further optionally coupled to one or both of bus interface unit 33 and SCOM interface 35, so that weights used in determining the contribution of each event type to the performance counts may be adjusted by program control. The adjustment may be made dynamically based on determinations of ongoing results provided by the performance monitoring, may be set in conformity with determinations of the type of workload being executed, or may be provided for further refinement of fixed values used in the performance estimations.

Figure 3:
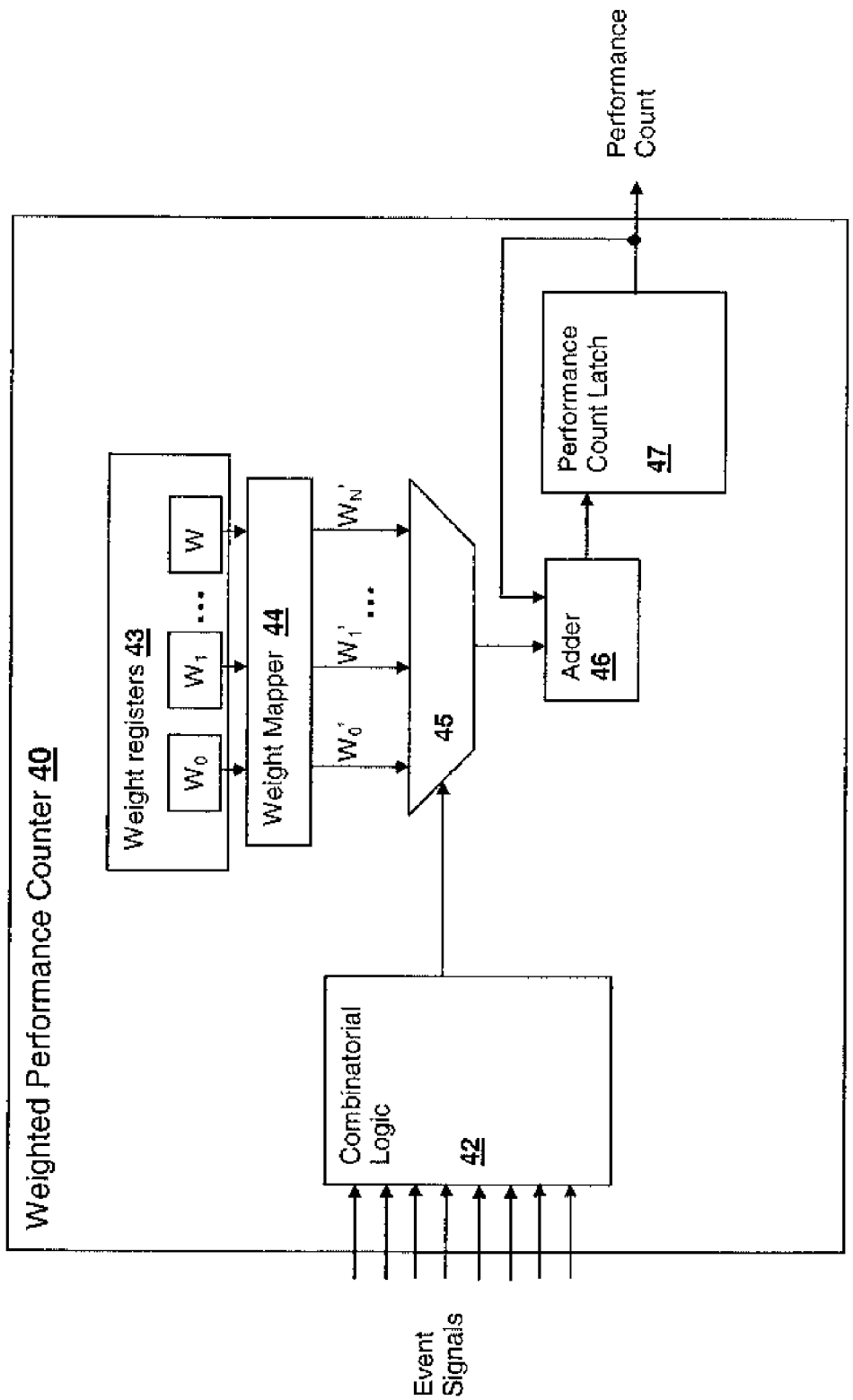
FIG. 3 is a circuit diagram of a weighted performance counter in accordance with an embodiment of the invention.

Referring now to FIG. 3, details of a weighted performance counter 40 in accordance with an embodiment of the invention, that may be used to implement performance counters 40A and 40B of FIG. 2, is illustrated. A combinatorial logic unit 42 combines a set of event signals received from functional units within processor 10, or other event signals according to the type of circuit or system for which performance is being measured. A resulting output number combines the events, which may be a binary number including a field for each event, or may include fields that reduce the bit width of the output number as will be described in further detail below. The combined event result is provided to the control input of a selector 45 that selectively applies a set of weights $\{W_0', W_1' \ldots W_N'\}$ to the input of an adder 46, which adds the combined weights with the present value of a performance count latch 47. For example, if event 0 occurred in a given processor cycle and event 1 did not, weight $W_0$ is added to the count, but $W_1$ is not added. Adder 46 has sufficient inputs of sufficient width to add each of weights $\{W_0', W_1' \ldots W_N'\}$ to the present value of performance count latch 47 and selector 45 selects between a zero value input and each weight input $\{W_0', W_1' \ldots W_N'\}$ according to a control signal provided as the combinatorial output of combinatorial logic unit 42.

Weights $\{W_0', W_1' \ldots W_N'\}$ are determined by a weight mapper 44 which scales values programmed in a set of weight registers 43, which may be set by program control as described above. In order to preserve resolution of the performance counting scheme, the values added to the count for each event must be scaled so that the difference between the weights are truly representative of the difference in correlation between performance and the occurrence of the event. For example, if an event weight were set to a value of 1, and another event had a relative performance correlation of 1.5, the relative weight for the other event could not be expressed accurately by a fixed point addition. Therefore, the range of weights $\{W_0', W_1' \ldots W_N'\}$ should be large enough to express fine differences in the relative correlation of the events to performance. However, even small weight ranges such as 0-3 (2-bits) will provide a reduction in error over systems that count a reduced number of events, in which events are counted uniformly or are counted in a multiplexed fashion so that the individual contributions to the polynomial performance metric are not simultaneously gathered.

Combinatorial logic unit 42 may reduce the bit width of the output selection signal, and thus the complexity and size of selector 45 as well as the number of weights required to implement weighted performance counter 40. One reduction is provided by mutually exclusive events having the same weight. The equal-weight mutually-exclusive event inputs can be combined by a logical-OR operation, since the resultant weight from that set of events will always be zero or a single weight value. Another way in which the bit width of the output selection signal may be reduced is to add events of the same weight that are not mutually exclusive, so that a field corresponding to the same-weight events is a binary number representing the number of events. For fields of that type, selector 45 receives a selection of the weight value and determines the weight value sufficient to provide to adder 46 a number expressing the product of the weight value with the number of same-weight events that are being combined in a single field.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method of determining a performance level of a processor, comprising:
   receiving a plurality of event signals from functional units within said processor corresponding to differing events within said processor;
   updating a performance counter in conformity with a totality of said plurality of event signals, wherein said updating assigns differing weights to at least two of said plurality of event signals, whereby a latency between accumulation of performance metrics corresponding to said events is reduced and said events are further separately weighted according to their correlation to performance of said processor; and
   reading said performance counter at periodic intervals to obtain a performance count.

2. The method of claim 1, wherein said receiving and updating are performed at each clock cycle of said processor.

3. The method of claim 1, further comprising adjusting said weights in conformity with values input to said processor.

4. The method of claim 1, further comprising:
   encoding said plurality of received event signals to provide a combinatorial value; and
   applying said weights to said combinatorial value to provide an update value, and wherein said updating adds said update value to a present value of said performance count to obtain a next performance count.

5. The method of claim 1, wherein said encoding merges said events that correspond to equal ones of said weights.

6. The method of claim 1, wherein said encoding encodes mutually exclusive events according to codes within a field of said combinatorial value.

7. The method of claim 1, further comprising:
   determining a power management figure for said processor in conformity with said performance count; and
   adjusting an operating parameter of said processor in conformity with a result of said determining.

* * * * *